(12) United States Patent (10) Patent No.: US 6,704,851 B2
Siebert (45) Date of Patent: Mar. 9, 2004

(54) METHOD OF DYNAMICALLY ALLOCATING A MEMORY

(75) Inventor: Fridtjof Siebert, Karlsruhe (DE)

(73) Assignee: Aicas GmbH, Karlsruhe (DE)

( * ) Notice: Subject to any disclaimer, the term of this patent is extended or adjusted under 35 U.S.C. 154(b) by 218 days.

(21) Appl. No.: 09/843,010

(22) Filed: Apr. 26, 2001

(65) Prior Publication Data

US 2002/0016896 A1 Feb. 7, 2002

(30) Foreign Application Priority Data

Apr. 26, 2000 (DE) .......................... 100 20 430

(51) Int. Cl.$^7$ .............................. G06F 12/00
(52) U.S. Cl. ................ 711/170; 711/129; 711/147; 711/171; 711/172; 711/173
(58) Field of Search ................ 711/170–173, 129, 711/147

(56) References Cited

U.S. PATENT DOCUMENTS 5,561,785 A * 10/1996 Blandy et al. ............. 711/170
6,085,296 A * 7/2000 Karkhanis et al. .......... 711/147
6,427,190 B1 * 7/2002 Hansen ..................... 711/129

* cited by examiner

Primary Examiner—T Nguyen
(74) Attorney, Agent, or Firm—Collard & Roe, P.C.

(57) ABSTRACT

A method for the dynamic management at a read-write memory which permits the storage and removal of objects of different sizes. The method comprises subdividing the read-write memory into memory blocks of a defined size and associating a memory management system with the read-write memory that stores objects according to at least two different methods or storage, either as a contiguous block composed or partial blocks, or as a block composed of distributedly arranged partial blocks. The choice of the respective storage method is based conditions given in advance, depending on the size of the free memory in relation to the size of the objects, such that, when the free memory is larger or equal to the size of the object that is to be stored, the object is stored contiguously, otherwise the object in stored distributedly.

15 Claims, 7 Drawing Sheets

METHOD OF DYNAMICALLY ALLOCATING A MEMORY

CROSS-REFERENCE TO RELATED APPLICATIONS

This application claims priority under 35 U.S.C. §119 of German No. DE 100 20 430.9, filed on Apr. 26, 2000.

BACKGROUND OF THE INVENTION

1. Field of the Invention

The invention describes a method for the dynamic management of a read-write memory. Such read-write memories are used in practically all data processing systems. In the context of these memories, in particular random-access-memories (RAM), the difficulty exists that originally free memory will be filled successively by objects of different sizes. At first, the memory will be filled compactly, i.e., stored objects are created contiguously in memory using the available memory optimally. When single objects are then deleted, gaps are created in the memory. Basically, the originally filled memory is again writeable. Nevertheless, the memory is then fragmented. This means, the memory consists of used and free memory ranges of different sizes. The problem arises that often there is sufficient free memory available, but there is not sufficient free memory ranges available in the required size. The fraction of memory that is lost due this fragmentation can be significant.

2. The Prior Art

For an improved memory management, systems are available that provide memory compaction. E.g., methods are known that copy used memory into another memory space so that used storage is contiguous and space that becomes free becomes available as a contiguous free memory range as well.

Alternatively, methods are known that shift used memory so that a larger contiguous free memory range results.

With both of these above mentioned methods of memory management, the problem arises that used memory cells must be moved. Hence, it is required that all references for identification of certain memory cells must be readdressed. Usually, this is achieved by relatively complex referencing methods, with the result that accesses are slowed down. In any case, this results in higher load on the processor.

Another problem with the above mentioned methods is that moving of memory objects must be characterized as expensive. At these times, the memory is not available for use. The above mentioned solutions are hence not sufficient for the application in conjunction with real-time systems like industrial automation systems. In the current state-of-the-art there are approaches to solve this problem by moving memory in successive steps. Through this, memory should remain available for use. The problem arises that arrangements must be made for single applications to remain functional in conjunction with partially moved objects. In effect, this also results in slower memory access or a slower data processing system in general, respectively.

An alternative solution of the problem is to use a single size for storing all objects. This ensures that basically memory can be used in a compact way. The difficulty with this method is, that a significant amount of memory is used, since all objects are stored using a single size: the size that corresponds to the largest object that has to be presumed. Alternatively, subdividing all objects into smaller partial objects of equal size is conceivable. The general subdivision into partial objects in turn has the disadvantage, that essentially a reference management must be provided to link the partial blocks of the subdivided objects

SUMMARY OF THE INVENTION

The basis of the invention is to create a method for the management of a read-write memory that avoids the above mentioned disadvantages as much as possible and that enables an optimal memory usage with preferably invariable processor and memory performance.

The problem addressed by the invention is solved using a method for dynamic memory management in accordance with the main claim. In doing so, the basic idea of the invention is to associate a memory with a memory management system that masters several, at least two, different methods for storage and corresponding management. Accordingly, depending on the object that needs to be stored and the currently available state of the memory, the suitable storage method is chosen as appropriate. Normally, the storage method will be chosen depending on the size of the object that needs to be stored in relation to the size of the free memory ranges for each case. For this, the memory management system first regards memory generally as subdivided into partial blocks of equal size, while it discriminates depending on the above mentioned condition, whether an object that needs to be stored will be stored in contiguous blocks, hence contiguously, or distributedly.

In the case of storing an object in the form of distributed partial blocks, the partial blocks of this object will be equipped each with links such that all partial blocks of this object are connected through links. This is the so-called storage in the form of a graph.

Depending of the kind and size of the single objects a certain method of storage will be chosen. As an example, instances of classes could in any case be arranged distributedly.

In an advantageous implementation, a linked list of the single partial blocks is created, at least for a part of the objects that are stored distributedly.

To achieve the fastest possible memory access, it makes sense to use a tree structure in the case of distributed storage. In this case, the distributedly stored partial blocks will be linked in the form of a branched tree.

A further increase in efficiency of the memory management system in conjunction with these tree structures is achieved by assigning a root block to every tree that stores the substantial information on the form of a tree of a stored object, such as its size.

In an advantageous implementation an identification number for the branching depth of the tree is stored in the root block.

An enhanced memory management system results as well from assigning a memory flag to every partial block that contains the information whether the corresponding partial block is part of a contiguously stored object or a distributedly stored object. In the case that the memory management system distinguishes between two means of storing objects, this flag can be a single bit.

In an advantageous implementation this memory flag can be stored in an unused bit of the corresponding partial block. This saves memory space.

In conjunction with the above mentioned root blocks it makes sense for the root block to contain an identification number for the tree depth of the corresponding tree.

In doing so, the memory flag and the identification number for the branching depth of the tree can be combined reasonably into a single memory element within the partial block that forms the root block. Through this, the memory need will be reduced again.

In conjunction with the objects that are stored as contiguous block an additional linklist can be created. This linklist ensures that all partial blocks of an object are reachable through links from the first partial block. Through this, the memory management systems recognizes that the participating partial blocks are part of a common object.

Again in an advantageous implementation, the memory management system creates a bitvector with one bit corresponding to each partial block of the memory. In doing so, every bit of the bitvector contains information about whether two consecutive partial blocks are partial blocks of the same object.

In an alternative implementation an object flag can be assigned to every partial block. This flag indicates whether two consecutive partial blocks are constituents of the same object. In doing so, what has been said about the single bits of the bitvector is valid for the assignment of the object flags.

BRIEF DESCRIPTION OF THE DRAWINGS

The invention will herein after be specified in more detail using several example implementations that will be depicted only schematically in drawing.

It is shown

FIG. 1 a memory management systems corresponding to the state-of-the-art in an illustration of principle, FIG. 2 a memory with memory management system, FIG. 3 storage of an object in contiguous and distributed partial blocks each with a memory flag, FIG. 4 storage of the same object using distributed partial blocks without memory flag, FIG. 5 the storage of additional objects using contiguous partial blocks and using distributed partial blocks laid out in a tree structure both with a memory flag, FIG. 6 storage of the object from FIG. 5 as a contiguous block and using distributed partial blocks laid out in a tree structure each with a combined memory flag, FIG. 7 storage of another object as a contiguous block with an additional linklist, FIG. 8 storage of another object as a contiguous block with an associated bitvector, FIG. 9 storage of a Java-object in two distributed blocks and FIG. 10 storage of another Java-object with two associated bitvectors.

DETAILED DESCRIPTION OF THE EMBODIMENTS

Figure 1:
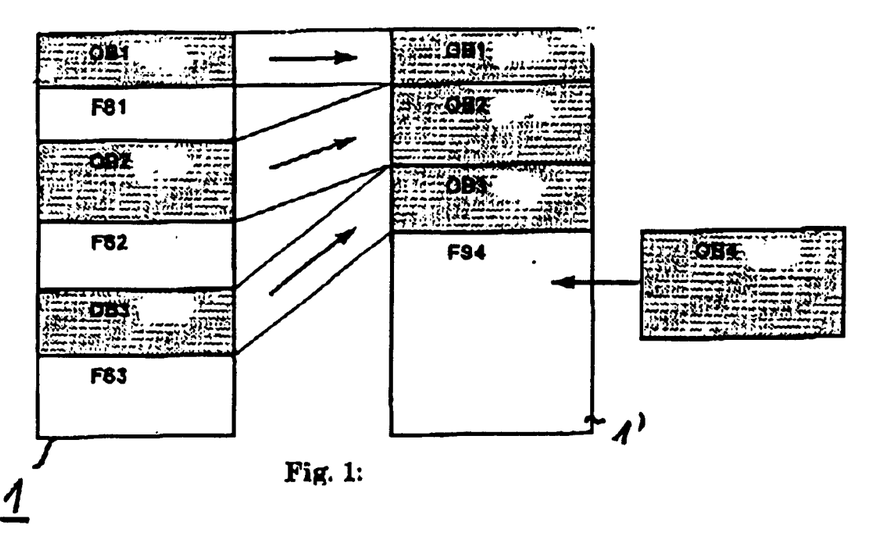

FIG. 1 shows a conventional memory management system with a memory 1, that contains different objects OB1 through OB3 in different memory regions. Between objects OB1 through OB3 memory cells are located that were free meanwhile. Nevertheless, these free memory cells are not sufficiently large to store another object OB4 in memory 1 contiguously.

As state-of-the-art for the solution of this problem software tools are known that can copy or move objects OB1 through OB3 such that the used memory cells, as well as the unused memory cells, are contiguous such that the fragmented memory 1 is transformed into an unfragmented memory 1'. After this, the newly free memory range FS 4 is sufficiently large to store object OB4.

The problem of this memory fragmentation is that the memory is typically not ready for accesses during the times of reorganization of the memory 1. Such a solution is therefore normally not applicable for real-time systems.

Figure 2:
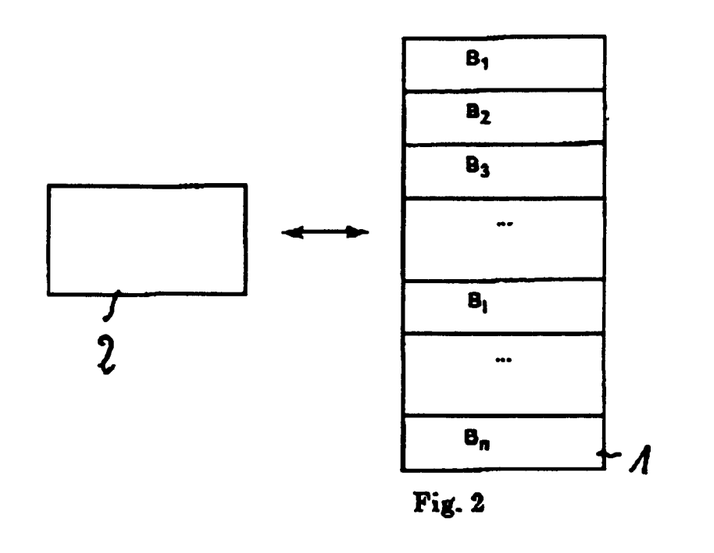

Within the scope of the solution in accordance with the invention the memory 1 is hence associated with a memory management system in accordance with the depiction in FIG. 2. This memory management system first subdivides, at least virtually, the memory in equally sized partial blocks B1–Bn. The memory management systems 2 can be an additional processor, a processor function or a software tool that is executable in the main memory of a processor of a data processing system.

After this real or virtual subdivision of the memory 1, several possibilities for the storage of objects result. In the scope of the invention the memory management system masters, in each case at least 2 different methods of storage.

Figure 3:
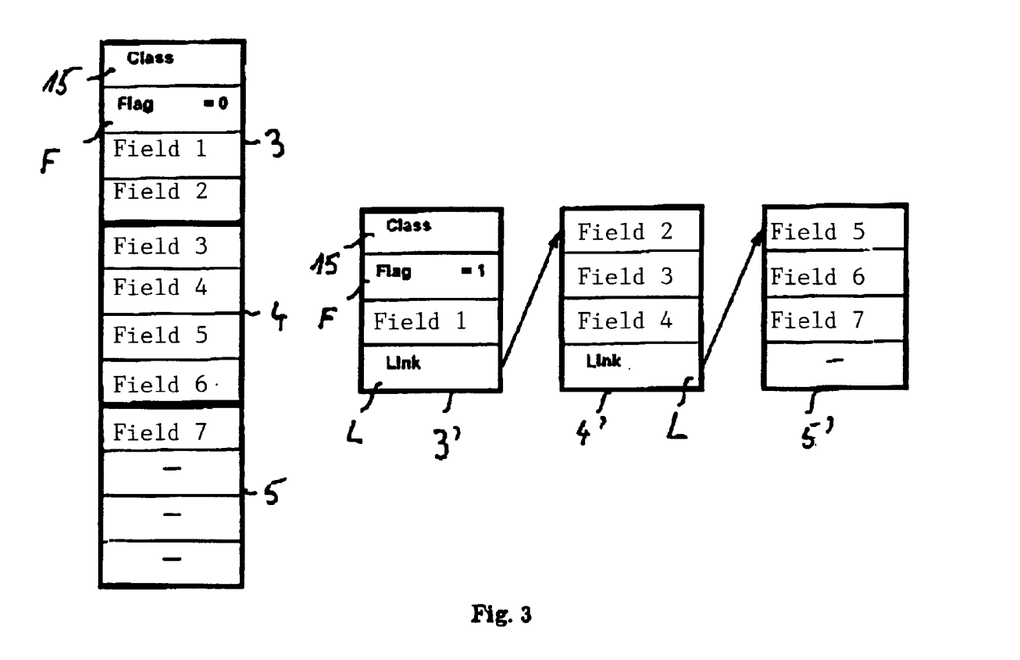

As an example two possible methods of storage that are at least mastered by the memory management system are compiled in FIG. 3. One of these methods might be the storage in the form of contiguous partial blocks in accordance with the left depiction in FIG. 3 or in the form of a distributed storage in accordance with the right depiction in FIG. 3 in the form of three distributedly arranged partial blocks 3', 4' and 5'. The distributedly arranged partial blocks 3', 4' and 5' are linked each with one another through a link L. The link L to the next block is for each block stored in the partial block itself, such as, e.g., in the partial blocks 3' and 4' in this example.

In the presented case, here with two possible methods of storage, a memory flag F gives the information, indicates, which kind of storage has been chosen. In the presented case, a value F=0 for the flag represents a contiguous and a value F=1 for the flag represents a distributed storage.

Figure 4:
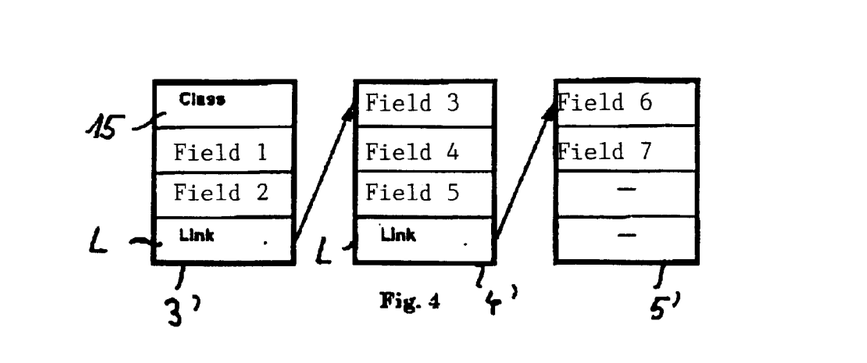

In accordance with the depiction in FIG. 4 a storage without the named memory flag F is of course possible as well. The memory range filled by the stored object will become smaller accordingly.

Figure 5:
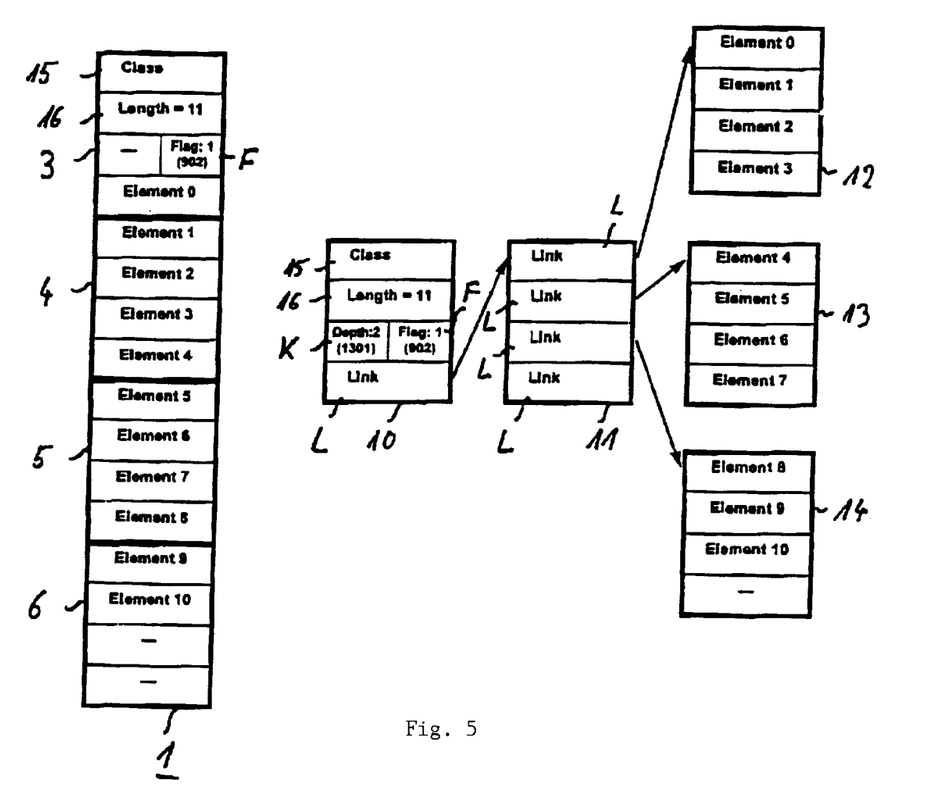

An alternative form of storage is depicted in FIG. 5. In accordance with the left depiction in FIG. 5 a storage of an object can be done in the form of contiguous partial blocks 3, 4, 5, and 6 or a storage can be done in the form of distributedly stored partial blocks 10 through 14 in accordance with the right depiction in FIG. 5. In doing so, the contiguous storage in accordance with the left depiction in FIG. 5 as well as the distributed storage in accordance with the right depiction in FIG. 5, both feature a memory flag F. Both depictions have in common that the memory management system has provided for a class element 15 corresponding to the particular object as well as a length element 16 corresponding to the length of the object. The memory elements 15 and 16 themselves do not represent constituents of the stored object, but serve for identification of the object. This information enables a convenient memory management.

The choice of storage method in the above mentioned, as well as in the below mentioned, methods of memory management are based on, for example, the relation of the available free memory FS to the size of the objects OB that need to be stored. Normally, a contiguous storage will be chosen whenever the free memory FS permits. Should this not be possible, as a general rule, a distributed storage is used as fall back.

In the implementation example depicted in FIG. 5, the stored object is represented in a tree structure. Such a tree structure is recommended, e.g., in conjunction with the storage of arrays.

In accordance with the right depiction in FIG. 5, the first partial block of such a tree structure, the so-called root block 10, contains, next to a link L, only information that describes the stored object as such. In addition to the class element 15 and the length element 16, this also consists of an identification number K for the branching depth. The branching depth in the presented case is 2. In an arrangement that optimizes memory space, the memory flag F and the identification number K can be combined in a single memory cell.

Figure 6:
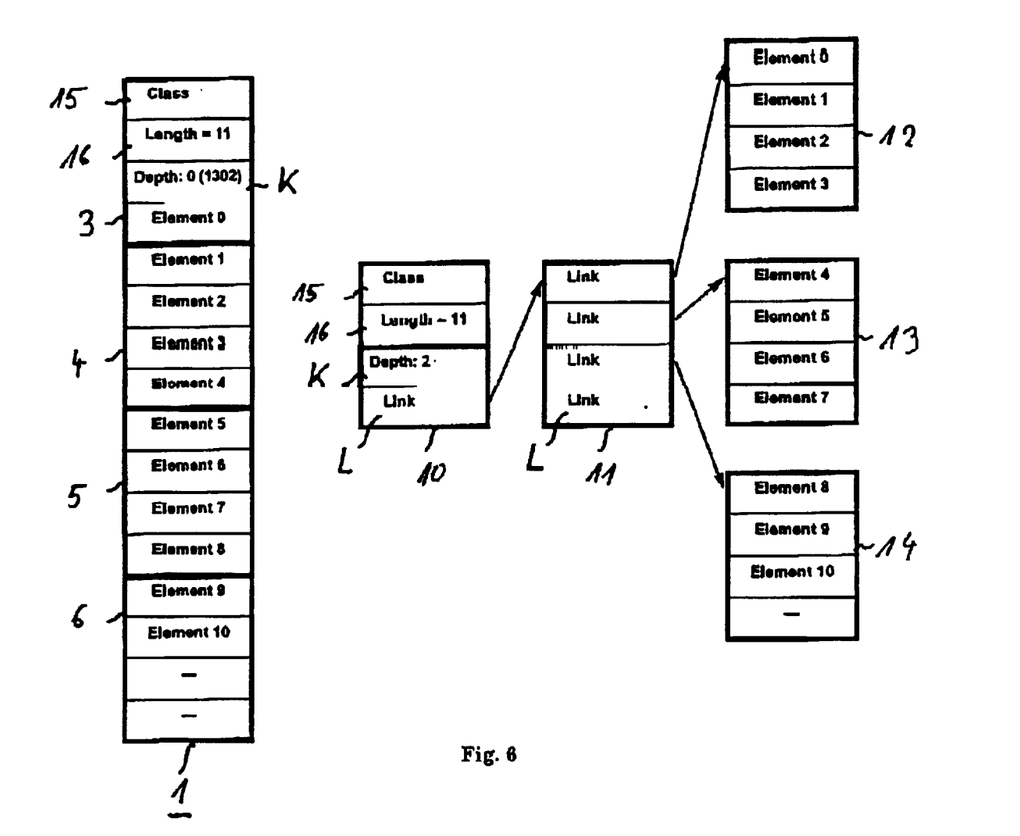

Such a combined representation appears in the right depiction of FIG. 6, that otherwise corresponds completely to FIG. 5.

The advantage of the tree structure represented in FIG. 5 and FIG. 6 lies in the fact that from one location, the root block 10, a faster access to the different partial blocks 12, 13 and 14 would be possible, as compared with a list like the one depicted on the right of FIG. 3. For this, the partial block 11 consists of a linklist, with links referring to partial block 12, 13 and 14 of the tree structure.

Figure 7:
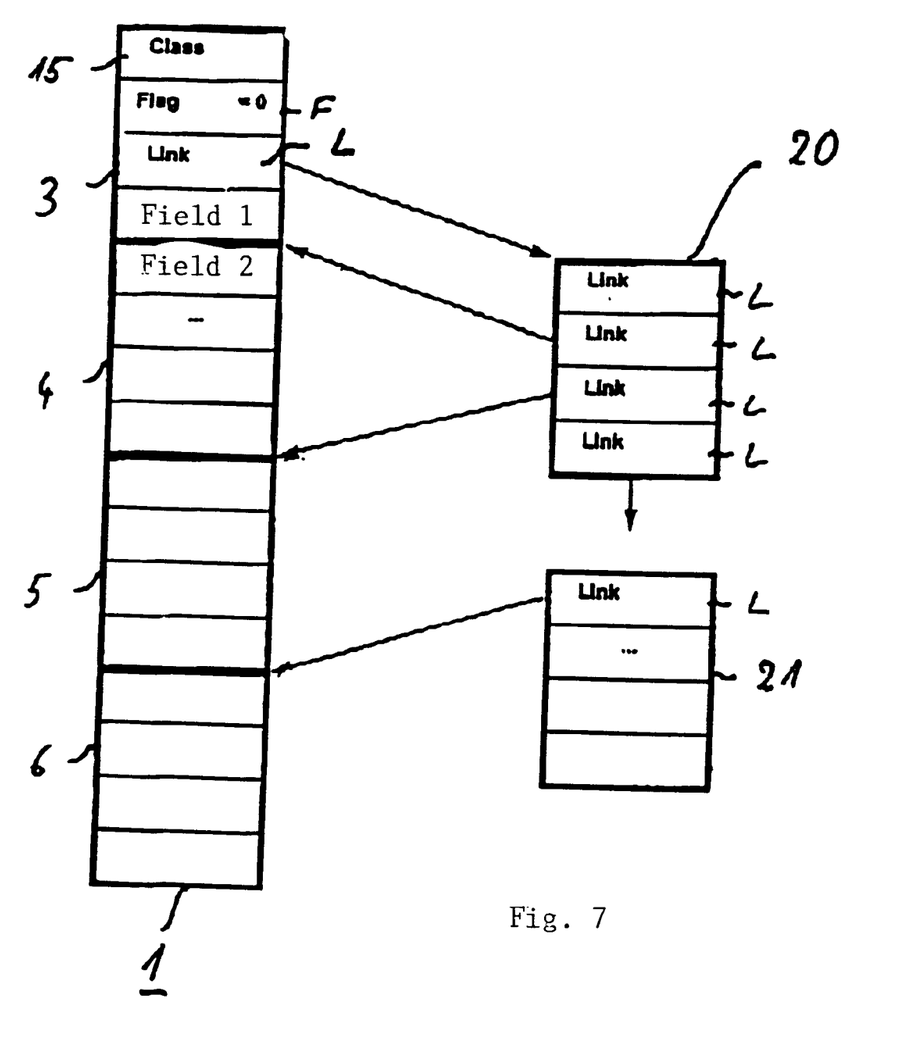

A linklist in accordance with FIG. 7 can be useful in conjunction with a contiguously stored object as in FIG. 7. On the basis of information as it is saved in accordance with FIG. 3 in conjunction with partial blocks 4 and 5, in the contiguous representation it is, due to certain circumstances, not possible to determine, if the partial blocks 4 and 5 are to be regarded as constituents of a common object with partial block 3.

This information results from the combination with the information stored in partial block 3, particularly from class element 15. This correlation results from the distributed storage in accordance with FIG. 3 for the partial blocks 3' and 4' from the mere existence of the link elements L.

For this reason, it can be reasonable in addition to the contiguous storage to create in each case another linklist in partial blocks 20 and 21 in accordance with the depiction in FIG. 7. This brings the advantage that all partial blocks 3, 4, 5, 6 that are part of an object are reachable from a single link element L of partial block 3.

Figure 8:
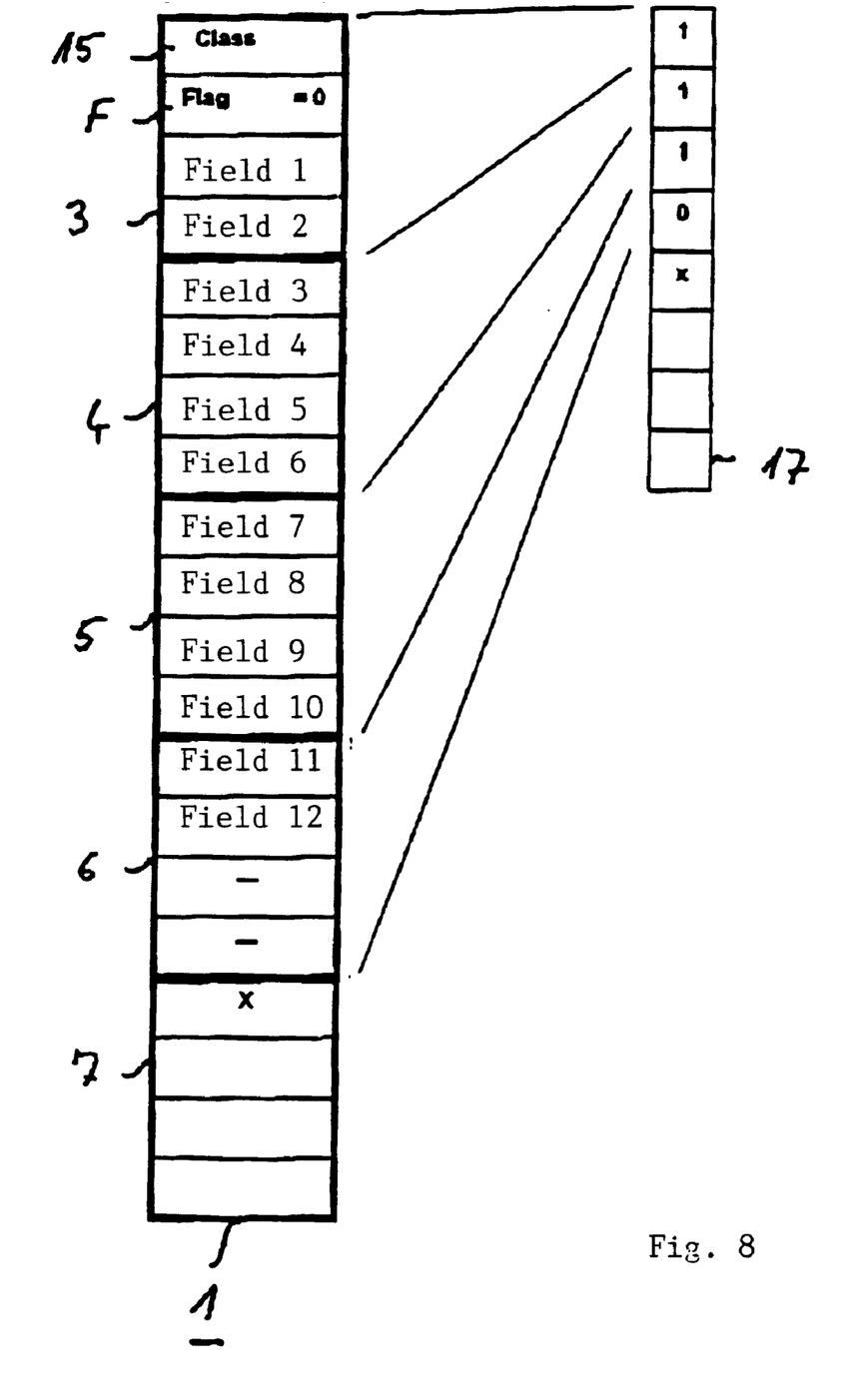

In an alternative or additional implementation in accordance with FIG. 8 in conjunction with a contiguous storage of partial blocks 3, 4, 5, 6 and 7, a bitvector 17 can be created that contains a bit for every partial block 3, 4, 5, 6, that provides information whether the following partial block is a part of the same object or not. In the present case, partial blocks 3, 4, 5, and 6 belong to the same partial object. Correspondingly, the first three bits from top to bottom in bitvector 17 are set. The partial block 7 is part of another object or not used. Correspondingly, the fourth bit from the top in the depiction of bitvector 17 is not set since the succeeding block 7 is not part of the same object.

Figure 9:
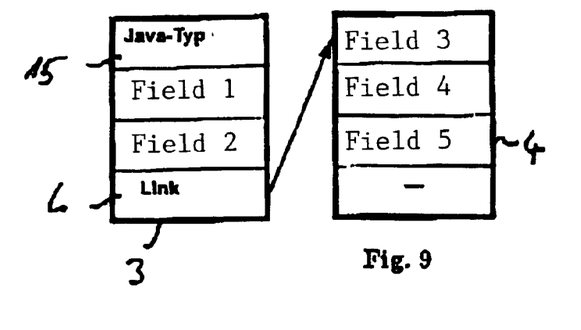

In accordance with FIG. 9 another possibility is illustrated of how a memory management system 2 can determine which method of storage is chosen. In the presented example, the class element 15 gives the information that the stored object is an instance. Consequently, the memory management system 2 chooses at all times a distributed storage in the presented example in the form of partial blocks 3 and 4 that are linked through link elements L.

As becomes clear from FIG. 9, the method of storage can also be determined from the kind of the stored object.

In accordance with a particular implementation of the invention, the memory management system, in accordance with the invention, can be used for the implementation of a Java virtual machine. Here, the Java virtual machine represents the memory management system 2. Provided that instances are at all times created distributedly in accordance with FIG. 9, no memory flag F needs to be set and no corresponding memory cell needs to be reserved.

Figure 10:
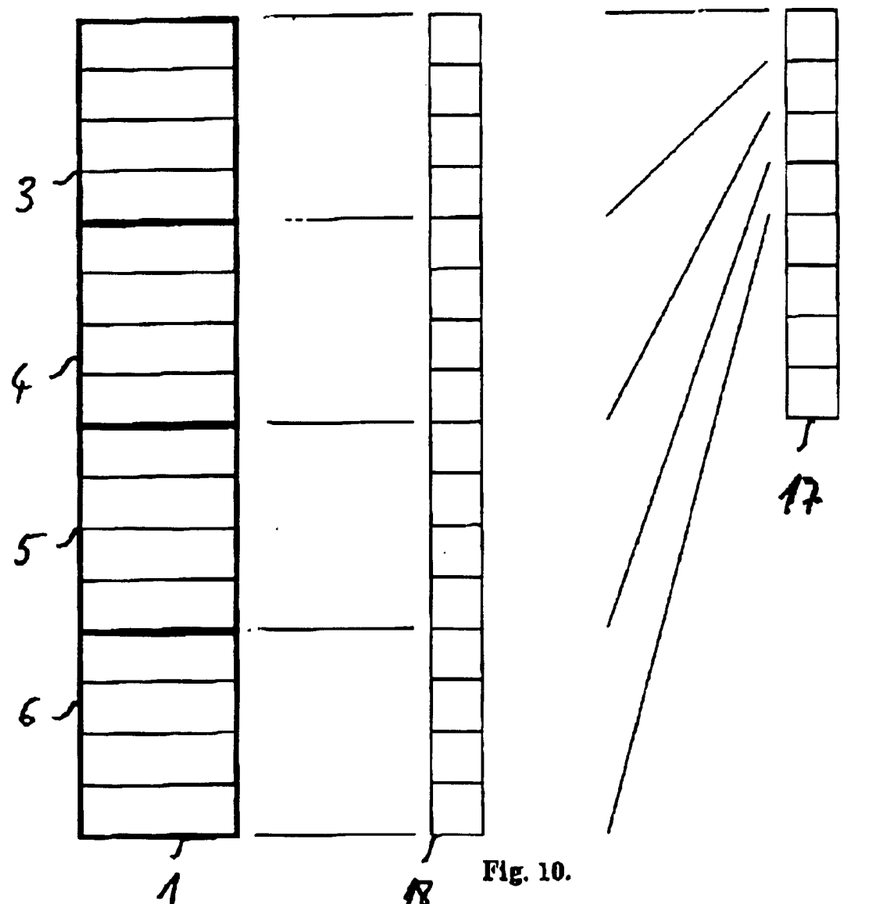

In conjunction with this it can make sense that an additional bitvector 18 is created that contains information for every memory cell of a partial block 3, 4, 5, 6, about whether the corresponding memory cell or memory word, respectively, is a link element L or not. In addition to the bitvector 18 the use of bitvector 17, that states whether the succeeding partial block is part of the same object or not, makes sense in conjunction with the storage of instances in accordance with FIG. 10.

As aforesaid, a method for a memory management system has been described that is characterized by mastering different methods for storage in each case, that are chosen depending on the object that is stored and the memory availability at a time.

LIST OF REFERENCES

OB 1–OB 4 objects
FS free memory space
L link element
F memory flag
K identification number
1 memory
2 memory management system
3–6 partial blocks
10 root block
11 linklist
12–14 partial block of tree
15 class element
16 length element
17 bitvector
18 another bitvector
20,21 more linklists

What is claimed is:

1. A method for the dynamic management of a rend-write memory which permits the storage and removal of objects of different sizes, comprising:
   subdividing the read-write memory into memory blocks of a defined size; and
   associating a memory management system with the read-write memory that stores objects according to at least two different methods of storage:
   as a contiguous block composed of partial blocks, or
   as a block composed of distributedly arranged partial blocks,
   wherein the choice of the respective storage method is based on conditions given in advance, depending on the size of free memory in relation to the size of the objects, such that, when the free memory is larger or equal to the size of the object that is to be stored, the object is stored contiguously, otherwise the object is stored distributedly.

2. A method according to claim 1, wherein said memory management system links the different partial blocks used in the distributed storage using links, wherein the links are stored in conjunction with the partial blocks.

3. A method according to claim 1, wherein at least come of the objects are stored distributedly at all times.

4. A method according to claim 3, wherein said memory management system creates a list of links to the partial objects at least for a part of the distributedly stored objects.

5. A method according to claim 1, wherein at least a part of the distributedly stored objects are stored in the form of a branched tree of partial blocks.

6. A method according to claim 5, wherein for every said tree of partial blocks root block with information about the respectively stored objects is created.

7. A method according to claim 6, wherein each root block contains an identification number indicating a branching depth of the tree.

8. A method according to claim 7, wherein at least some or the objects are associated with a memory flag, wherein the memory flag indicates whether the object is a contiguously stored block or a distributedly stored block.

9. A method according to claim 8, wherein the memory flag is respectively stored in an otherwise unused bit of the object.

10. A method according to claim 8, wherein the memory flag is present in the root block.

11. A method according to claim 9, wherein the memory flag and identification number are combined within a word or memory cell of the root block.

12. A method according to claim 1, wherein the memory management system creates additional linklists for at least some of the partial blocks of objects that are stored as a contiguous block, such that all other partial blocks are reachable from a first partial block.

13. A method according to claim 1, wherein the memory management system creates a bitvector for at least some of the objects that are stored as a contiguous block of partial blocks, wherein each bit of the bitvector is non-ambiguously associated with a partial block and indicates whether the succeeding partial block is a part of the same stored object.

14. A method according to claim 1, wherein every partial block at the memory is associated with an object flag that indicates whether two succeeding partial books of the memory are constituents of the same stored object.

15. A method according to claim 13, wherein another bitvector is provided much that every memory cell is associated with one bit and said one bit is set depending on whether the memory cell is a link.

* * * * *